United States Patent [19]

Callan

[11] Patent Number: 4,504,927
[45] Date of Patent: Mar. 12, 1985

[54] PROGRAMMABLE CONTROLLER WITH EXPANDABLE I/O INTERFACE CIRCUITRY

[75] Inventor: John E. Callan, Milwaukee, Wis.

[73] Assignee: Allen-Bradley Company, Milwaukee, Wis.

[21] Appl. No.: 415,915

[22] Filed: Sep. 8, 1982

[51] Int. Cl.³ .............................................. G06F 9/06
[52] U.S. Cl. .................................................. 364/900
[58] Field of Search ................. 364/200, 900, 167, 130

[56] References Cited

U.S. PATENT DOCUMENTS

| | | | |
|---|---|---|---|
| 4,050,098 | 9/1977 | Seipp | 364/900 |
| 4,153,945 | 5/1979 | Actor et al. | 364/900 |
| 4,155,115 | 5/1979 | Wilske | 364/107 |
| 4,162,536 | 7/1979 | Morley | 364/900 |
| 4,189,769 | 2/1980 | Cook et al. | 364/200 |
| 4,200,930 | 4/1980 | Rawlings et al. | 364/200 |
| 4,207,609 | 6/1980 | Luiz et al. | 364/200 |
| 4,215,395 | 7/1980 | Bunyard et al. | 364/101 |
| 4,245,307 | 1/1981 | Kapeghian et al. | 364/200 |
| 4,246,637 | 1/1981 | Brown et al. | 364/200 |
| 4,250,563 | 2/1981 | Struger | 364/900 |
| 4,254,473 | 3/1981 | Galdun et al. | 364/900 |
| 4,275,455 | 6/1981 | Bartlett | 364/900 |
| 4,276,594 | 6/1981 | Morley | 364/200 |
| 4,293,924 | 10/1981 | Struger et al. | 364/900 |
| 4,404,651 | 9/1983 | Grudowski | 364/900 |
| 4,413,319 | 11/1983 | Schultz et al. | 364/200 |

*Primary Examiner*—Gareth D. Shaw
*Assistant Examiner*—Jameson Lee
*Attorney, Agent, or Firm*—Barry E. Sammons

[57] ABSTRACT

A programmable controller has eight I/O buses which will support a corresponding number of I/O modules. The I/O capacity of the programmable controller may be increased by replacing four of the I/O modules with an I/O address module and three I/O interface modules that drive I/O expansion buses. Up to eight I/O racks, each containing three I/O modules and one adaptor circuit, can be connected to the I/O expansion buses.

3 Claims, 6 Drawing Figures

PROGRAMMABLE CONTROLLER WITH EXPANDABLE I/O INTERFACE CIRCUITRY

BACKGROUND OF THE INVENTION

The field of the invention is programmable controllers such as those disclosed in U.S. Pat. Nos. 4,165,534; 4,266,281; and 4,291,388.

Programmable controllers are employed in many industrial and commercial applications to control the operation of various types of machines. Programmable controllers are characterized by the repeated execution of a stored control program which contains instructions that direct the controller to examine the status of various sensing devices on the controlled machine and to operate various output devices on the controlled machine.

The size, or capacity, of a programmable controller should be compatible with the size of the machine or process being controlled. Size is typically measured by the number of I/O points the controller can support without degrading its response time. In many applications this goal is met with a relatively small capacity programmable controller, but in some applications additional I/O points are required which may exceed the capacity of a small programmable controller.

One solution to this problem is disclosed in U.S. Pat. No. 4,250,563 where the processor in a low capacity programmable controller may be easily replaced with a more powerful processor which will support additional I/O points. Another solution which is applicable to some installations is disclosed in U.S. Pat. No. 4,319,338 entitled "Industrial Communications Network". The industrial communications network enables programmable controllers to be connected together through a high speed data link. Although this network has very effectively enabled programmable controllers to communicate with each other, and has thereby facilitated the addition of controllers as the control task grows, the hardware required for such communications networks is relatively expensive.

In some applications the sensing devices and operating devices on the machine or process being controlled are distributed over a wide area, and it is desirable to employ a plurality of small programmable controllers which are distributed throughout the facility rather than a single large programmable controller. A system suitable for such applications is disclosed in copending U.S. patent application Ser. No. 352,014 which was filed on Feb. 24, 1982, and is entitled "Communications Network for Programmable Controllers".

SUMMARY OF THE INVENTION

The present invention relates to a programmable controller having an I/O bus structure for supporting directly a selected number of I/O modules and a multiplexing system for expanding the number of I/O modules supported by the I/O bus structure. This is accomplished by an I/O address module and a set of I/O interface modules which couple the I/O bus structure to I/O expansion buses that connect to a plurality of I/O racks. Each I/O rack contains an adapter circuit which enables the I/O rack when its rack address is generated by the I/O address module, and each I/O rack mounts a set of I/O modules which communicate with the I/O interface modules.

A general object of the invention is to expand the I/O capacity of a programmable controller having a fixed I/O bus structure. The I/O data is multiplexed through the I/O interface modules to addressed I/O racks. A portion of the I/O bus structure is employed by the I/O address module to enable the proper I/O rack.

Another object of the invention is to enable the I/O racks to be located remotely from the processor. This is accomplished in part by the I/O interface modules which are designed to connect to one end of the I/O expansion buses and in part by interface circuits located in the I/O racks which couple the I/O modules to the other end of the I/O expansion buses.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
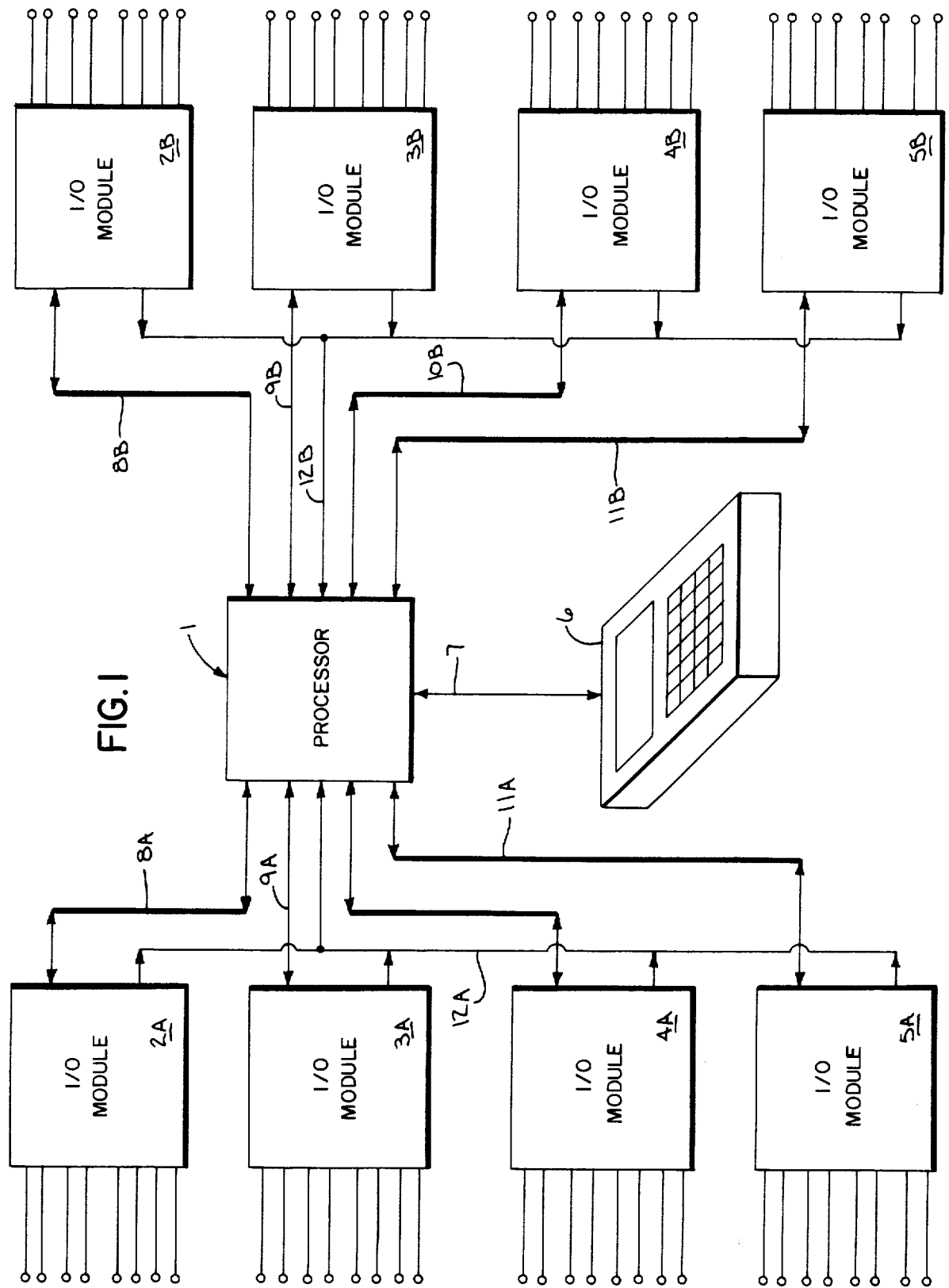
FIG. 1 is a block diagram of the programmable controller configured with the maximum number of I/O modules which can be directly supported.

Referring particularly to FIG. 1, the programmable controller system includes a processor 1 which executes a stored control program to operate machinery connected to eight I/O modules 2A–5A and 2B–5B. The control program is enterred into the processor 1 using a hand-held programming terminal 6 which connects to the processor 1 through a serial data line 7.

Each I/O module 2–5 includes either four input circuits or four output circuits which connect to the processor 1 through respective 4-bit I/O buses 8A–11A and 8B–11B. In addition, each I/O module 2–5 connects to an ID bus 12A or 12B which contains two leads for each module 2–5. Each output circuit may be separately controlled to operate a device such as a motor starter, solenoid or lamp, and each input circuit monitors the state of a device such as a switch. When configured as shown in FIG. 1, the programmable controller can thus support up to 32 I/O points.

Figure 2:
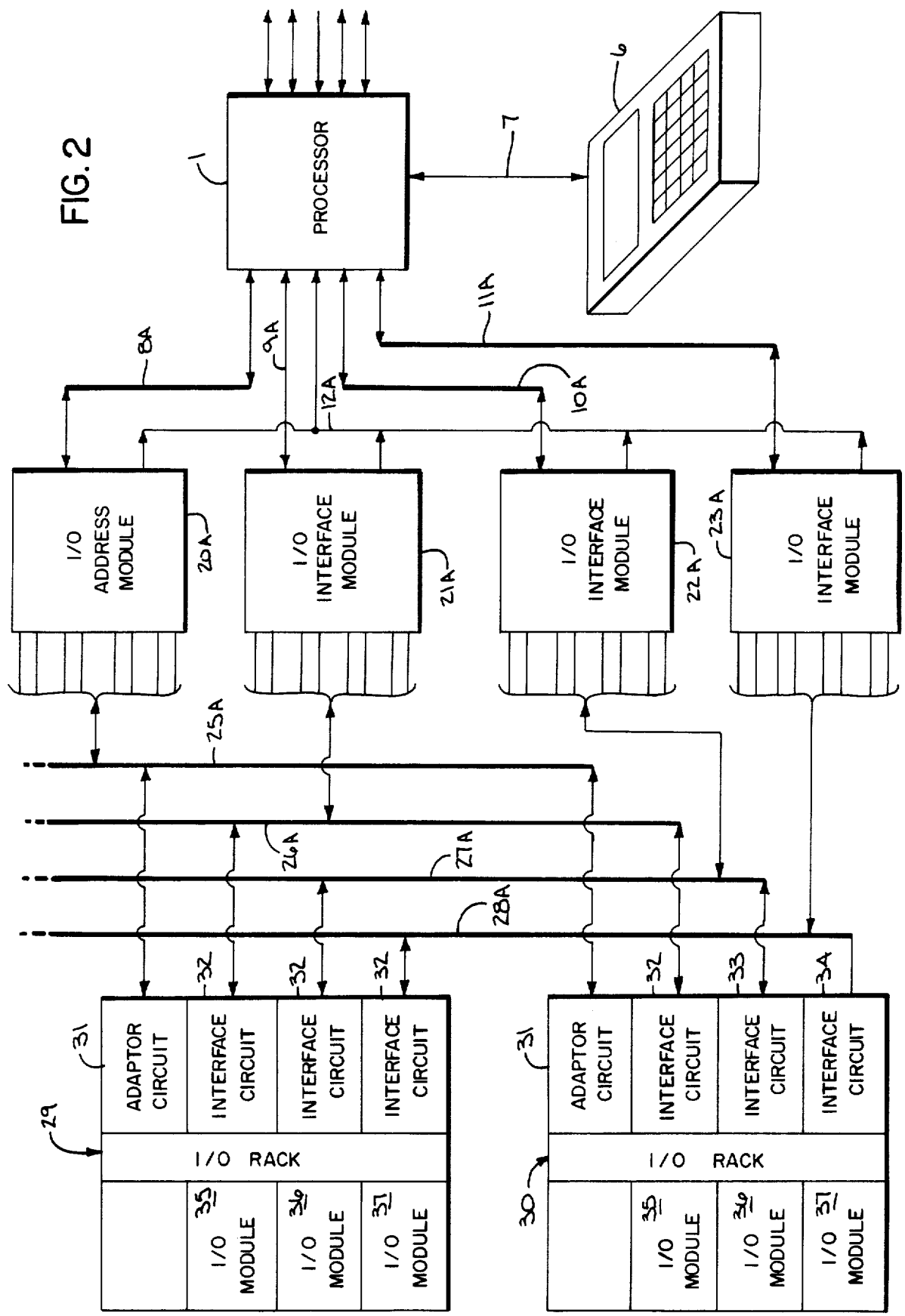
FIG. 2 is a block diagram of the programmable controller configured with the multiplexer which expands the number of I/O modules that can be supported.

Referring particularly to FIG. 2, the programmable controller can be configured to support up to ninety-six I/O points by connecting an I/O address module 20A and three I/O interface modules 21A–23A to the respective I/O buses 8A–11A. The modules 20A–23A in turn connect to I/O expansion buses 25A–28A which connect to a series of I/O racks. Up to eight I/O racks may be supported by the I/O expansion buses 25A–28A and two of these are indicated in FIG. 2 at 29 and 30.

Each I/O rack 29 and 30 includes an adaptor circuit 31 which connects to the I/O expansion bus 25A and three interface circuits 32-34 which connect to the I/O expansion buses 26A-28A. As will be explained in more detail below, the I/O address module 20A generates a rack address on the expansion bus 25A and the adapter circuits 31 in each I/O rack 29 and 30 compare this address with their own preset I/O rack number. When identity is detected, the I/O rack is enabled to both receive output data from the I/O expansion buses 26A-28A and send input data back to the I/O interface modules 21A-23A through the buses 26A-28A. The processor 1 may thus exchange I/O data with a selected I/O rack 29 or 30 by writing the corresponding rack number to the I/O address module 20A.

Referring still to FIG. 2, each I/O rack 29 and 30 includes up to three I/O modules 35-37 which may be identical in construction to the I/O modules 2-5 employed in the conventionally configured system of FIG. 1. These I/O modules 35-37 may be any of a variety of modules. However, the direction of data flow, and hence the choice of input or output module, is determined by the choice of I/O interface modules 21A-23A. For example, if the I/O interface module 21A is a four channel output circuit, then the I/O module 35 in each I/O rack is an output module and its corresponding interface circuit 32 receives output data from the I/O expansion bus 26A. If the I/O interface module 22A on the other hand, is a four channel input circuit, then the I/O module 36 in each I/O rack is an input module. In other words, either four input channels or four output channels are formed by each I/O interface module 21A-23A, and the choice will determine the nature of the corresponding I/O module 35-37 in each I/O rack attached to the I/O expansion buses 26A-28A.

A detailed description of an input channel and an output channel will be described below with reference to FIGS. 4 and 5. But first, a detailed description of the processor 1 will be made with reference to FIG. 3.

Figure 3:
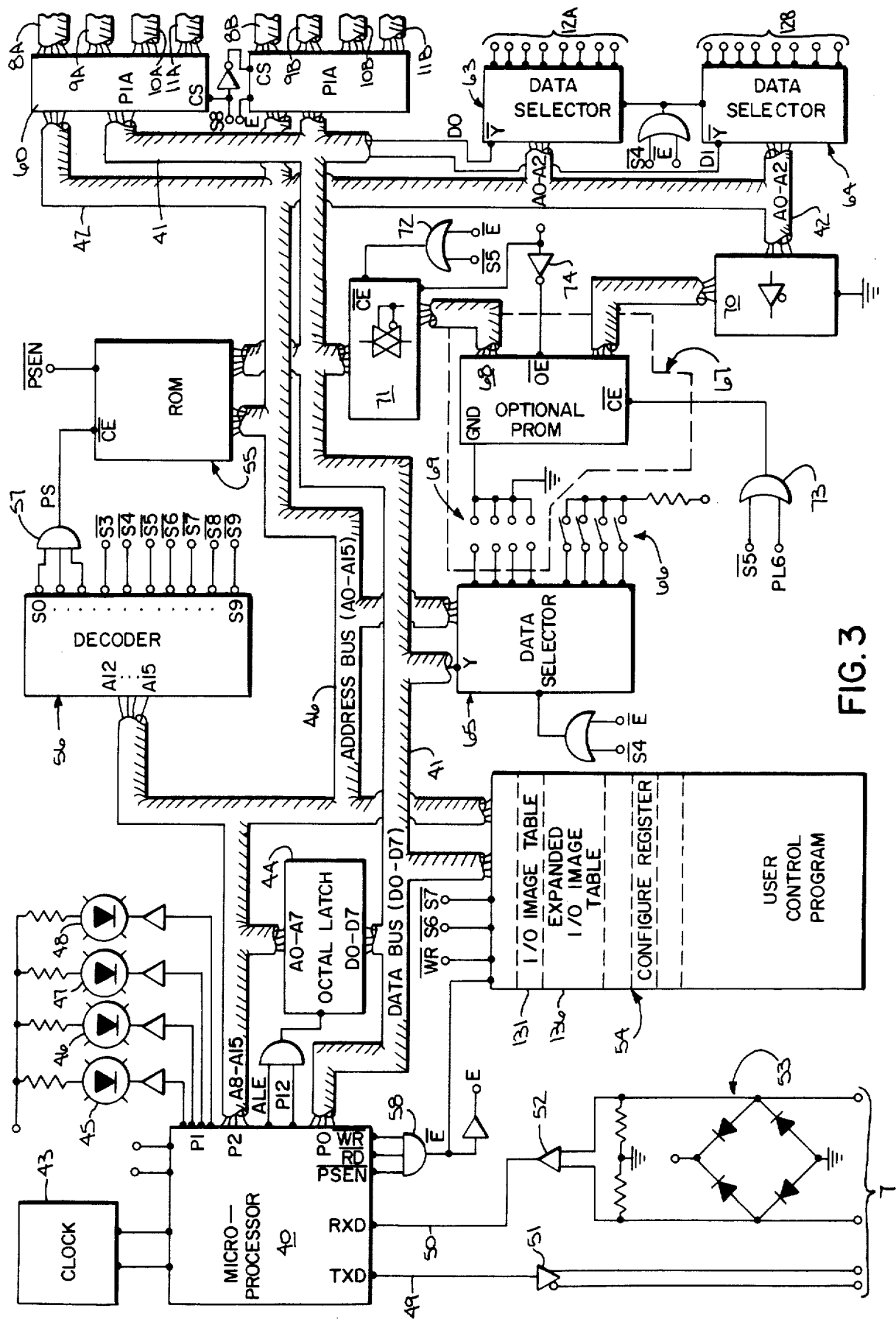
FIG. 3 is an electrical schematic diagram of the processor which forms part of the system of FIGS. 1 and 2.

Referring particularly to FIG. 3, the processor 1 is structured around an 8-bit microprocessor 40 which drives an 8-bit data bus 41 and a 16-bit address bus 42. A model 8051 microprocessor manufactured by Intel Corporation is employed and it is driven by a 7 MHz clock 43. A read or write operation is performed by first outputting through 8-bit microprocessor port P0 the least significant address byte to an octal latch 44 and then generating the most significant address byte directly on the address bus 42 through an 8-bit microprocessor port P2. An 8-bit byte of data is either input or output through port P0 when this 16-bit address is generated. A third 8-bit microprocessor port P1 is employed for a number of control functions, including the operation of four light-emitting diodes 45-48 which indicate the operating mode of the programmable controller.

The microprocessor 40 includes a full duplex universal asynchronous receiver/transmitter which outputs serial data at a TXD terminal 49 and which receives serial data at an RXD terminal 50. The TXD terminal 49 connects to the input of a line driver 51 which couples to the serial data link 7 and the RXD input 50 connects to a line receiver 52. The inputs to the line receiver 52 are driven by the serial data link 7 through a voltage limiting circuit 53. Communications with the hand held terminal 6 is thus established directly with the microprocessor 40.

The microprocessor 40 also contains a 4K×8 read-only memory which stores programs that direct the operation of the microprocessor 40. In addition, a 4K×8 CMOS random access memory (RAM) 54 is connected to the data bus 41 and address bus 42 along with an additional 4K×8 read-only memory (ROM) 55. The memories 54 and 55 along with other elements in the processor 1 are enabled by a BCD-to-ten-bit decoder circuit 58 which connects to leads A12-A15 in the address bus 42. Three outputs S0-S2 of the decoder 56 connect to an AND gate 57 which drives a chip enable terminal (CE) on the ROM 55, and decoder outputs S6 and S7 connect to chip enable terminals on the RAM 54. Program instructions and constants may be read from the ROM 55 when it is addressed and a program store enable line (PSEN) is driven low by the microprocessor 40. Data may be read from or written to the RAM 54 when it is addressed and an enable line ($\overline{E}$) is driven low by an AND gate 58. A write control line ($\overline{WR}$) driven by the microprocessor 40 determines if a write operation is to be performed and a read control line ($\overline{RD}$) is driven low during read operations.

The microprocessor 40 is coupled to the I/O buses 8-11 by a pair of peripheral interface adapters (PIA) 60 and 61. The PIAs 60 and 61 each include two 8-bit ports which may be separately configured as input or output points by commands received through the data bus 41. Each of these 8-bit ports is divided to form two of the I/O buses 8-11 and data is input from these or output to them when the decoder output S3 is enabled. Address bus leads A0-A4 connect to the control terminals on the PIAs 60 and 61 and the operation of the PIAs is thus completely controlled by the microprocessor 40 under the direction of stored programs. Table A is a memory map which indicates the functions performed by the PIAs 60 and 61 when read or write operations are performed on the indicated addresses.

TABLE A

| HEX ADDR | DESCRIPTION |
| --- | --- |
| 3010 | (WRITE TO THE DATA DIRECTION REGISTER FOR BUS 08A AND BUS 09A TO SET 08A AS INPUT OR OUTPUT AND TO SET 09A AS INPUT OR OUTPUT) OR (WRITE TO 08A AND TO 09A) |
| 3011 | (WRITE TO THE DATA DIRECTION REGISTER FOR BUS 10A AND BUS 11A TO SET 10A AS INPUT OR OUTPUT AND TO SET 11A AS INPUT OR OUTPUT) OR (WRITE TO 10A AND TO 11A) |
| 3012 | (WRITE TO THE DATA DIRECTION REGISTER FOR BUS 08B AND BUS 09B TO SET 08B AS INPUT OR OUTPUT AND TO SET 09B AS INPUT OR OUTPUT) OR (WRITE TO 08B AND TO 09B) |
| 3013 | (WRITE TO THE DATA DIRECTION REGISTER FOR BUS 10B AND BUS 11B TO SET 10B AS INPUT OR OUTPUT AND TO SET 11B AS INPUT OR OUTPUT) OR (WRITE TO 10B AND TO 11B) |
| 3014 | READ BUS 08A AND BUS 09A |
| 3015 | READ BUS 10A AND BUS 11A |
| 3016 | READ BUS 08B AND BUS 09B |
| 3017 | READ BUS 10B AND BUS 11B |
| 3018 | WRITE TO THE CONTROL REGISTER TO PREPARE FOR SET-UP CONDITIONS FOR BUS 08A AND BUS 09A |
| 3019 | WRITE TO THE CONTROL REGISTER TO PREPARE FOR SET-UP CONDITIONS FOR BUS 10A AND BUS 11A |
| 301A | WRITE TO THE CONTROL REGISTER TO PREPARE FOR SET-UP CONDITIONS FOR BUS 08B AND BUS 09B |
| 301B | WRITE TO THE CONTROL REGISTER TO PREPARE FOR SET-UP CONDITIONS FOR BUS 10B AND BUS 11B |

As indicated above, the PIA ports may be separately configured as input or output points. This configuration is performed during initialization of the system after power-up. To determine whether a particular I/O bus 8-11 is an input or output channel a pair of 8-bit data selectors 63 and 64 are connected to the respective data bus leads D0 and D1. The eight inputs on each data selector 63 and 64 connect to leads in the ID buses 12A and 12B and the three select terminals connect to address bus leads A0-A2. Two leads in the ID bus 12 connect to each I/O module 2-5, in a conventionally configured system (FIG. 1), or to an I/O interface module 20-23, in an expanded configuration (FIG. 2). As will be described in more detail below, when one of these two leads is active an output channel is indicated, and when the other leads is active, an input channel is indicated. By addressing the data selectors 63 and 64 during initialization, the microprocessor 40 reads the status of each I/O channel to determine whether it is active, and if so, whether it is an input or output channel.

At the same time the data selectors 63 and 64 are addressed, a third data selector 65 is addressed. The output of the data selector 65 connects to data bus lead D2 and its select terminals connect to address bus leads A0-A2. Four inputs to the data selector 65 connect to the four poles of a switch 66 and the remaining four inputs connect to an optional memory module 67. The poles switch 66 are manually set to provide data that describes the program memory configuration and one of the four inputs from the memory module 67 is connected to circuit ground to indicate the type of memory module used. Table B is a memory map of the addresses which enable the data selectors 63-65 and the functions which are performed.

TABLE B

| HEX ADDR | DESCRIPTION |
|---|---|
| 4000-4002 | Read program memory configuration. |
| 4003-4007 | Read memory module type. |
| 4000-4007 | Read the type of I/O module (input, output, address, neither) employed in the eight I/O slots. |

The memory module 67 is formed on a separate circuit board which is inserted into a connector on the processor's main circuit board. One of four devices may be employed as the memory 68 in the optional memory module 67. These devices include a 2K×8, 4K×8 or 8K×8 UVPROM device, or a 2K×8 electrically erasable PROM. The type of memory module used is indicated by grounding one of four inputs to the data selector 65 with a jumper wire soldered to selector pads 69 which are formed on the module's circuit board. Address bus leads A0-A11 are coupled to the memory module 67 by bus driver gates 70, and the eight leads in the data bus 41 are coupled to the module 67 by bus transceiver gates 71. The transceiver gates 71 are enabled when an OR gate 72 is operated by control lines E and S5, and the direction of data flow is determined by the state of lead 5 of the microprocessor port P1. The memory device 68 in the memory module 67 is enabled by an OR gate 73 which is driven by the decoder output S5 and lead 6 of the microprocessor port P1. An inverter gate 74 drives an output enable terminal $\overline{OE}$ on the memory device 68 when a read operation is performed.

As indicated above, when the programmable controller is configured with expanded I/O capability, a set of input channels are formed for inputting machine status data into the processor 1 and a set of output channels are formed for outputting status data to the machine being controlled. Referring particularly to FIGS. 2 and 4, each output channel includes four output points which are driven by one of the I/O interface modules 21A-23A through one of the expansion buses 26A-28A. In FIG. 4, the I/O interface module 21A is shown as an output channel which drives four output circuits in the output module 35. The I/O interface module 21A in this case is comprised of four bus driver circuits 80 which have their inputs connected to the four leads in the I/O bus 9A. Their output terminals connect to the four leads in the I/O expansion bus 26A which in turn connects to the interface circuit 32 of each I/O rack 29 and 30.

The interface circuit 32 of this output channel includes four line receivers 81 which connect to the respective leads in the I/O expansion bus 26A. The line receivers 81 connect to the data input terminals of a quad latch 82, and when the latch 82 is clocked by an output enable line 83, the state of the bus 26A is stored in the latch 82. The four output terminals Q1-Q4 of the latch 82 drive the inputs to four a.c. output circuits contained in the I/O module 35. One of these four output circuits is shown in FIG. 4 and it includes a trigger circuit 84 which generates trigger pulses to a triac 85 when its input is at a logic low voltage. When thus triggered into its conductive state, the triac 85 conducts a.c. power to a load attached to output terminals 86. When the trigger circuit 84 is disabled, the triac 85 becomes non-conductive and the attached load is deenergized.

Figure 4:
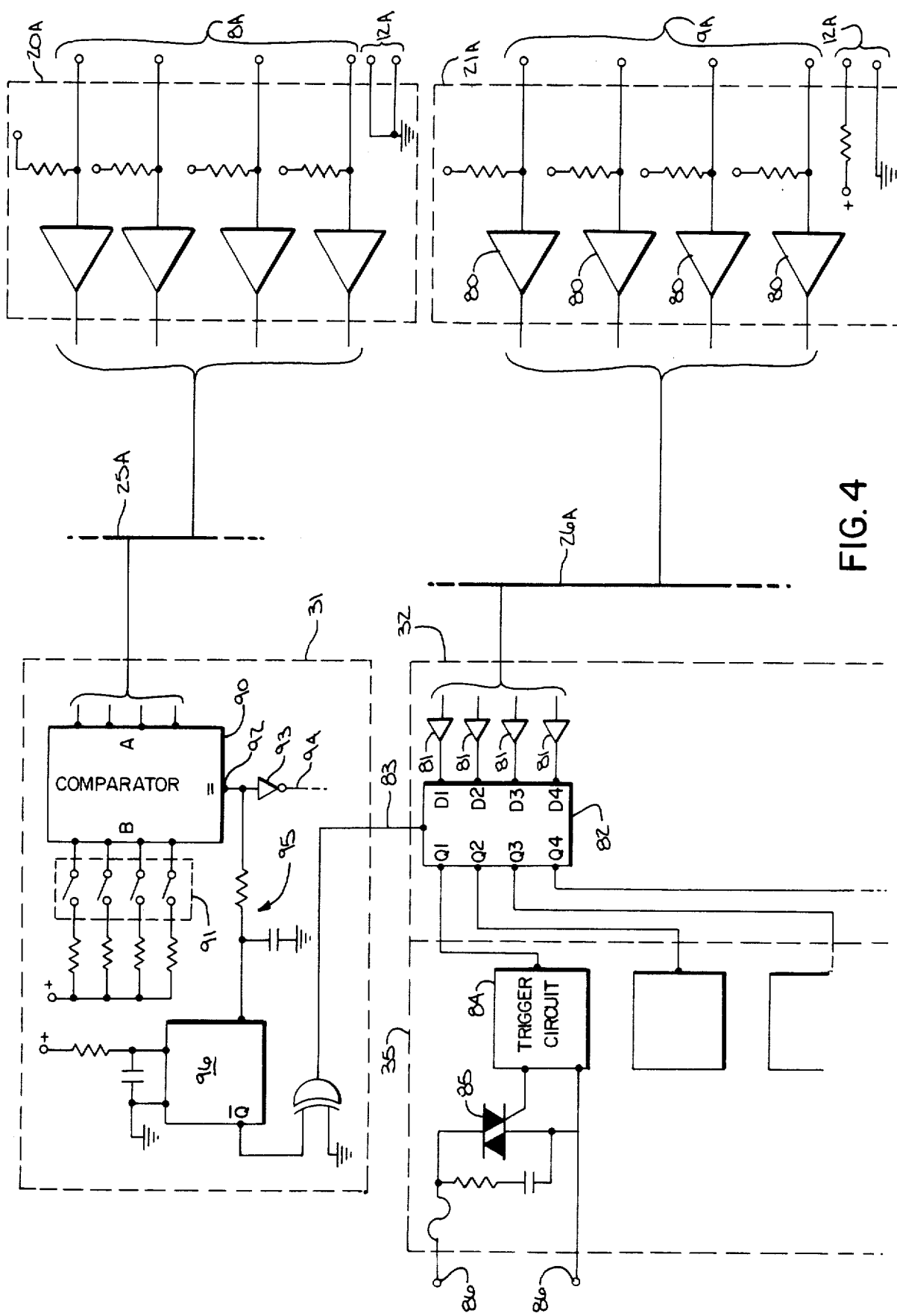
FIG. 4 is an electrical schematic diagram of an output channel which forms part of the system of FIG. 2.
Figure 5:
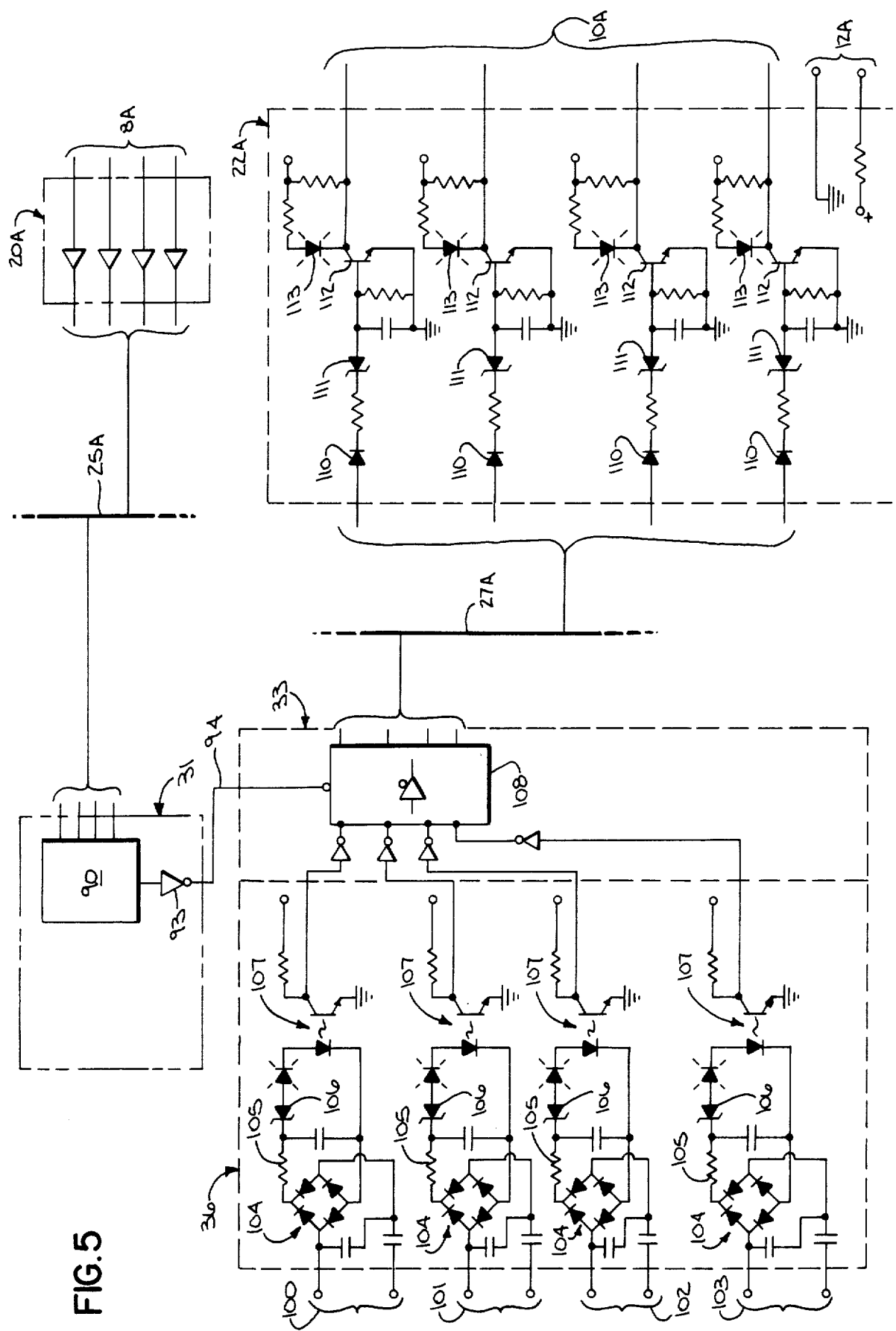
FIG. 5 is an electrical schematic diagram of an input channel which forms part of the system of FIG. 2.

Referring particularly to FIG. 4, the output enable line 83 is driven by the adaptor circuit 31 and extends to each interface circuit in the I/O rack. The adaptor circuit 31 includes a 4-bit comparator circuit 90 which has its A inputs connected to the four leads in the I/O expansion bus 25A. Its B inputs are connected to the poles of a 4-bit DIP switch 91 which is manually preset to indicate a unique I/O rack number. When this I/O rack number is generated on the I/O expansion bus 25A, a logic high voltage appears at an output terminal 92. The output 92 connects to a line driver gate 93 which controls an input enable line 94, and it connects through an R-C delay circuit 95 to the input of a monostable multivibrator 96. The monostable multivibrator 96 generates a 20 microsecond pulse on the output enable line 83 five microseconds after the comparator 90 detects the I/O rack address on the I/O expansion bus 25A. This delay allows output data on the I/O expansion bus 26A time to settle before it is clocked into the latch 82.

The input channels operate in a very similar manner to the output channels, but data flow is in the opposite direction. Referring particularly to FIGS. 2 and 5, an input module 36 is employed with an input interface circuit 33 and an input interface module 22A to couple four bits of input data to the processor 1. Numerous types of input modules may be employed and the module 36 shown in FIG. 5 includes four a.c. input circuits which detect the presence of a 110 volt alternating current applied to their input terminals 100-103. Each input circuit includes a bridge rectifier 104 and filter circuit 105 which convert the a.c. input to a d.c. voltage, and each includes a zener diode 106 which reduces this d.c. voltage to a value which produces a ten milliampere current flow through the diode in an optical coupler 107.

The logic level signal generated by the optical coupler 107 in each input circuit is applied to the inputs of a 4-bit line driver circuit 108. When a logic low signal is generated on the input enable line 94 by the adaptor circuit 31, the state of the four input circuits is gated onto the I/O expansion bus 27A. These four digital signals are thus applied to the inputs of four identical interface circuits in the interface module 22A.

Each interface circuit in the module 22A includes diodes 110 and zener diodes 111 which protect the circuit from excessive voltage spikes and electric noise which may be induced onto the I/O expansion bus 27A. The input signals are applied to the base of a transistor 112 which amplifies the signal to drive both a light emitting diode 113 and a lead in the I/O bus 10A. The state of each input point 100–103 is thus continuously applied to the respective leads in the I/O bus 10A as four logic level signals.

It should be apparent that a number of variations can be made in the above described I/O circuitry. In the preferred embodiment the input modules and output modules may be used either in the conventional configuration of FIG. 1 or the expanded configuration of FIG. 2. While this reduces the number of different types of I/O module constructions that are required, it does require that interfaced circuits 32–34 be provided on each I/O rack to connect these standard I/O modules 35–37 to the I/O expansion buses 26A–28A. An alternative design might include the interface circuits 32–34 as part of the I/O module or as part of the adaptor circuit 31.

The microprocessor 40 executes program instructions stored in the ROM 55 to perform programmable controller functions. In general terms these functions include inputting the state of all sensing devices connected to input modules, executing a user control program comprised of programmable controller instructions, and outputting state signals to operating devices connected to each output module. These functions are performed continuously and repeatedly when the controller is in the RUN mode.

Figure 6:
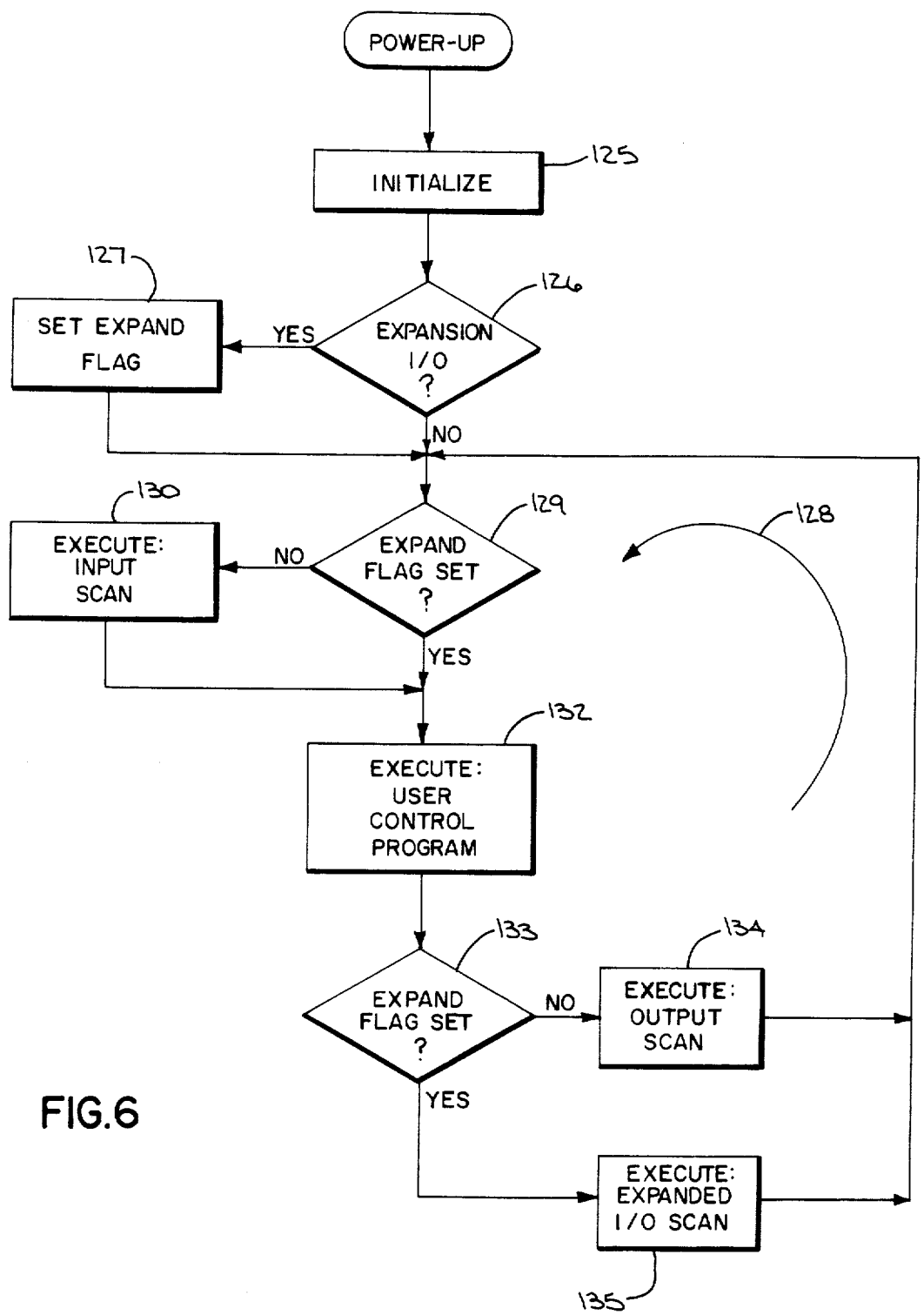
FIG. 6 is a flow chart of the programs executed by the microprocessor shown in FIG. 3.

Referring particularly to FIGS. 3 and 6, when the programmable controller is powered-up it executes a number of instructions indicated by process block 125 which initialize the hardware elements and the system data structures. Among these data structures is a 16-bit configure register which stores the I/O configuration data which is input from the bus 12 through the data selectors 63 and 64. If an I/O address module is connected (i.e. a pair of leads 12A or 12B are both grounded), the I/O expansion feature is indicated. This is tested at decision block 126, and if I/O expansion is indicated, an expand flag is set at process block 127. A loop indicated generally by the arrow 128 is then entered.

The loop 128 is repeatedly executed while the controller is in the RUN mode. It includes instructions indicated by decision block 129 which check the expand flag. If this flag is not set, an input scan subroutine is executed at process block 130 to update an image table 131 in the RAM 54 with the status of all sensing devices connected to the controller input modules. In either case the user control program is then executed as indicated by process block 132. The user control program is executed by sequentially reading user instructions from the RAM 54 and interpreting them in a manner indicated in U.S. Pat. Nos. 4,165,534 or 4,282,584 or in co-pending U.S. patent application Ser. No. 314,596 filed on Oct. 26, 1981, and entitled "Processor Module for a Programmable Controller". When the "END" instruction is read from the user control program, the system resumes executing instructions in the loop 128. These include instructions indicated by decision block 133 which test the expand flag, and if it is not set, an output scan subroutine indicated at process block 134 is executed. The output scan subroutine 134 transfers the contents of the I/O image table 131 to the output modules which are connected to the processor. On the other hand, if the expand flag is set, an expanded I/O scan subroutine is executed as indicated by process block 135. This subroutine 135 outputs the contents of the I/O image table 131 and an expanded I/O image table 136 to the output modules and it then inputs data to these image tables 131 and 136 from the input modules. Listings in assembly language of the expanded I/O scan subroutine 135 as well as other programs stored in the ROM 55 is provided in Appendix A.

| COMPONENT APPENDIX | |
|---|---|
| Microprocessor 40 | 8-bit microcomputer model 8051 manufactured by Intel Corp. |
| Octal Latch 44 | Octal D-type latch model 74LS373 manufactured by Texas Instruments, Inc. |
| Decoder 56 | Four-line-to-ten-line decoder model 74LS42 manufactured by Texas Instruments, Inc. |
| Data Selectors 63–65 | Data Selector/Multiplexer model 74LS251 manufactured by Texas Instruments, Inc. |
| Gates 71 | Octal bus transceivers model 74LS245 manufactured by Texas Instruments, Inc. |
| PIA 60 and 61 | Peripheral interface adaptor model 68B21 manufactured by Motorola, Inc. |

APPENDIX A

INTERPRETER ROUTINE

```
MOVX    @R0,A           ;return output to output
                        image table
MOV     C,MCRFLG        ;initialize rung to mcr state
INC     DPTR            ;set interpreter pointer to
                        next op code
MOVX    A,@DPTR         ;first byte of jump address
```

-continued

| | JNB | P,PARITY | ;into accumulator<br>;parity error if even parity in op code |
|---|---|---|---|
| | CLR | ACC.0 | ;strip parity bit from opcode |
| | PUSH | ACC | ;start forming fake return address on stack |
| | PUSH | TABMSB | ;msb of jump table onto stack |
| | INC | DPTR | ;set data pointer to address of instruction |
| | MOVX | A,@DPTR | ;operand address to accumulator |
| | JB | P, PARITY | ;check for address parity error |
| | CLR | ACC.7 | ;clear parity bit in operand |
| | MOV | R0,A | ;operand address to R0 index register |
| | MOVX | A,@R0 | ;operand to accumulator |
| | RET | | ;jump to address created on the stack |

I/O INITIALIZATION

| | | | |
|---|---|---|---|
| IOSETUP: | MOV | DPTR,#CONFIG | ;set to confi space |
| | MOV | R2,#8 | ;set up loop count |
| LOOPIO: | MOVX | A,@DPTR | ;get config bits |
| | CLR | C | |
| | ORL | C,/ACC.0 | ;get config bit inverted |
| | XCH | A,IOCONF1 | ;get first config register |
| | RRC | A | ;shift in first bit |
| | XCH | A,IOCONF1 | ;restore configuration |
| | CLR | C | |
| | ORL | C,/AAC.1 | ;get other config bit |
| | MOV | A,IOCONF2 | ;get second i/o config bit |
| | RRC | A | ;shift in second bit |
| | MOV | IOCONF2,A | ;save configuration |
| | INC | DPTR | ;set to next config addr |
| | DJNZ | R2,LOOPIO | ;loop through rest of config |
| | MOV | DPTR,#IOMAP | ;address i/o direction map |
| | MOV | R0,#IOCONF1 | ;index to first i/o config byte |
| LOOPIO2: | MOV | A,@R0 | ;get config bits |
| | SET B | TBIT | ;set loop counter |
| LOOPIO3: | MOV | ATEMPC,#0 | ;clear direction bits |
| | JB | ACC.0,AOK | ;test for output module |
| | ORL | ATEMPC,#0FH | ;set outputs |
| AOK: | JB | ACC.2,AOK2 | ;test for out in msb |
| | ORL | ATEMPC,#0F0H | ;set out in msb |
| AOK2: | XCH | A,ATEMPC | ;get direction byte |
| | MOVX | @DPTR,A | ;save in direction map |
| | XCH | A,ATEMPC | ;return io bits |
| | SWAP | A | ;get other io bits in place |
| | INC | DPTR | ;address next direction cell |
| | JBC | TBIT,LOOPIO3 | ;do second half of word |
| | INC | R0 | ;address next config bit |
| | CJNE | R0,#IOCON2+1,LOOPIO2 | ;do next cell |
| | MOV | A,IOCONF1 | ;test for expanded i/o |
| | ANL | A,#0C0H | ;if both bits are 0, adr module |
| | CLR | EXPAND | ;reset expansion present bit |
| | JNZ | NOEXPAND | ;expanded i/o not present |
| | SETB | EXPAND | ;set expanded i/o bit |
| | MOV | P2,#HIGH(FSELECT+5) | ;don't want forces on adr field |
| | MOV | R1,#LOW(FSELECT+5) | |
| | MOV | DPTR,#IOBITS+5 | ;address first expansion byte |
| | MOV | R0,#0 | ;clear address field |
| LOOPXPAND: | MOVX | A,@DPTR | ;get expansion i/o byte |
| | SWAP | A | ;addr to ls nibble |
| | ANL | A,#0F0H | ;clear address nibble |
| | ORL | A,R0 | ;enter expansion address |
| | ORL | A,#8 | ;turn off strobe byte |
| | SWAP | A | ;restore addr to ms nibble |
| | MOVX | @DPTR,A | ;restore to nv ram |
| | MOVX | A, R1 | ;get force select byte |
| | ANL | A,#0FH | ;zero forces on addr nibble |
| | MOVX | @R1,A | ;restore to force table |
| | INC | R1 | ;addr next force secret addr |
| | INC | R1 | |
| | INC | DPTR | ;inc to next rack address |
| | INC | DPTR | |
| | INC | R0 | ;inc expand addr |
| | CJNE | R0,#8,LOOPXPAND | ;set remaining addresses |

INPUT SCAN SUBROUTINE
;

| | | | |
|---|---|---|---|
| UPDIN: | ACALL | INIVECT | ;set up pointers |
| UPDIN6: | ACALL | UPDIN5 | ;read inputs |
| | ACALL | INCVECT1 | ;increment the pointers |
| | CJNE | R0,#LOW(RPRA)+4,UPDIN6 | ;loop if not done yet |
| | RET | | |

|  |  |  | -continued |
|---|---|---|---|
| ; | read PIA inputs | | |
| UPDIN5: | MOV | DPL,R5 | ;point to i/o direction |
|  | MOVX | A,@DPTR | ;get i/o direction |
|  | MOV | R6,A | ;save as output mask |
|  | CPL | A | ;make input mask |
|  | MOV | R7,A | ;1=inputs,0=outputs |
|  | MOVX | A,@R0 | ;get data from 6821 PIAs |
|  | CPL | A | ;convert to positive logic |
|  | ANL | A,R7 | ;mask off outputs |
|  | MOV | R1,A | ;save new inputs |
| ; | force any inputs on or off as required | | |
|  | MOV | DPL,R3 | ;point to force selected |
|  | MOVX | A,@DPTR | ;get force selected bits |
|  | ANL | A,R7 | ;make input force selected bits |
|  | MOV | R7,A | ;save input force selected bits |
|  | CPL | A | ;make input force selected mask |
|  | ANL | A,R1 | ;mask off forced inputs |
|  | MOV | R1,A | ;save unforced inputs |
|  | MOV | DPL,R4 | ;point to force states |
|  | MOVX | A,@DPTR | ;get force states |
|  | ANL | A,R7 | ;make forced on selected bits |
|  | ORL | A,R1 | ;make new inputs with forces |
|  | MOV | R1,A | ;save new inputs with forces |
| ; | update a byte in the i/o status table | | |
|  | MOV | DPL,R2 | ;point to i/o table |
|  | MOVX | A,@DPTR | ;get old i/o states |
|  | ANL | A,R6 | ;mask off old input states |
|  | ORL | A,R1 | ;combine new inputs with old outputs |
|  | MOVX | @DPTR,A | ;write to table |
|  | RET | | |
| OUTPUT SCAN SUBROUTINE | | | |
| UPDOUT: | ACALL | INIOUT | ;initialize output addresses |
|  | MOV | R7,#0 | ;zero immediate output state |
| UPDOUT6: | ACALL | UPDOUT5 | ;update outputs |
|  | ACALL | INCVECT2 | ;advance pointers |
|  | CJNE | R0,#LOW(WPRA)+4,UPDOUT5 | ;loop if not done yet |
|  | RET | | |
| ; | | | |
| ; | get output data from table | | |
| ; | | | |
| UPDOUT5: | MOV | DPL,R2 | ;point to i/o table |
|  | MOVX | A,@DPTR | ;get data from table |
|  | ORL | A,R7 | ;turn on immediate output rung |
|  | JB | TBIT2,SETQ | ;test for rung on or off |
|  | XRL | A,R7 | |
| SETQ: | MOVX | @DPTR,A | ;restore updated output |
|  | MOV | R1,A | ;save outputs |
| ; | force any outputs on or off as required | | |
|  | MOV | DPL,R3 | ;point to force selected |
|  | MOVX | A,@DPTR | ;get force selected bits |
|  | MOV | R5,A | ;save force selected bits |
|  | CPL | A | ;make output force selected mask |
|  | ANL | A,R1 | ;mask off forced outputs |
|  | MOV | R1,A | ;save unforced outputs |
|  | MOV | DPL,R4 | ;point to force states |
|  | MOVX | A,@DPTR | ;get force states |
|  | ANL | A,R5 | ;make forced on selected bits |
|  | ORL | A,R1 | ;make new outputs with forces |
| ; | update PIA outputs | | |
| ; | | | |
|  | CPL | A | ;convert to negative logic |
|  | MOVX | @R0,A | ;write to PIAs |
|  | RET | | |
| INCVECT1: | INC | R5 | ;advance pointers |
| INCVECT2: | INC | R0 | |
|  | INC | R2 | |
|  | INC | R3 | |
|  | INC | R4 | |
|  | RET | | |
| INIOUT: | MOV | R2,#LOW(IOBITS) | ;point to i/o states |
|  | MOV | R3,#LOW(FSELECT) | ;point to force select |
|  | MOV | R4,#LOW(FSTATE) | ;point to force state |
|  | MOV | P2,#HIGH(WPRA) | ;point to PIAs page |
|  | MOV | R0,#LOW(WPRA) | ;point to write only outputs |
|  | MOV | DPH,#HIGH(IOBITS) | ;point to i/o page |
|  | RET | | |
| EXPANDED I/O SCAN SUBROUTINE | | | |
| EXPIO: | MOV | R2,#LOW(IOBITS+4) | |
|  | MOV | R3,#LOW(FSELECT+4) | |
|  | MOV | R4,#LOW(FSTATE+4) | |
|  | MOV | P2,#HIGH(WPRA) | ;point to PIAs page |

-continued

| | | | |
|---|---|---|---|
| | MOV | DPH,#HIGH(IOBITS) | ;point to i/o page |
| LOOPEXP: | MOV | R0,#LOW(WPRA) | ;point to write only outputs |
| | MOV | R7,#0 | ;zero the immediate i/o state |
| | CALL | UPDOUT5 | ;sent out data |
| | CALL | INCVECT2 | ;address next i/o slot |
| | CALL | UPDOUT5 | send out nibble and address |
| | MOV | DPL,R2 | ;address i/o page |
| | MOVX | A,@DPTR | ;get i/o address |
| | ANL | A,#7FH | ;set strobe |
| | MOVX | @DPTR,A | ;restore to i/o page |
| | CALL | UPDOUT5 | ;turn on address ok strobe |
| | MOV | R0,#LOW(RPRA) | ;switch back to first address |
| | DEC | R2 | |
| | DEC | R3 | |
| | DEC | R4 | |
| | MOV | R5,#LOW(IOMAP) | ;set address i/o direction map |
| | CALL | UPDIN5 | ;read inputs |
| | CALL | INCVECT1 | ;address next input slot |
| | CALL | UPDIN5 | ;read single nibble |
| | CALL | INCVECT2 | ;address next i/o |
| | CJNE | R4,#LOW(FSELECT),LOOPEXP | ;test for end of expand scan |
| | RET | | |

I claim:

1. In a programmable controller having a processor which repeatedly executes a user control program and an I/O scan program including an I/O scan sequence, and having a fixed number of I/O buses for interfacing the processor with a corresponding number of I/O modules, the improvement therein comprising:

an I/O address module connected to one of the I/O buses for receiving data from the processor and generating a rack address on a first I/O expansion bus said I/O address module including means for signaling the processor that the I/O address module is connected to said one I/O bus; a set of I/O interface modules connected to a set of other ones of the I/O buses and to a corresponding set of additional I/O expansion buses, each I/O interface module being operable to couple data between one of said other I/O buses and one of said additional I/O expansion buses; an I/O rack which includes:

(a) an adaptor circuit connected to the first I/O expansion bus for receiving the rack addresses generated thereon and producing an enabling signal when its preselected rack address is received thereon; and (b) a set of I/O modules each coupled to one of the additional I/O expansion buses to couple data between devices on a machine being controlled and its associated additional I/O expansion bus when the enabling signal is produced;

wherein the processor includes means responsive to the signal from the I/O address module for altering the I/O scan program such that a different I/O scan sequence is performed in the I/O scan program's next execution.

2. The programmable controller as recited in claim 1 in which there are a plurality of I/O racks and the adapter circuit in each is responsive to a different rack address generated on the first I/O expansion bus.

3. The programmable controller as recited in claim 1 in which each I/O rack includes a set of interface circuits, each interface circuit being connected between an I/O module and its associated I/O expansion bus, and each interface circuit being operable to transform the voltage level used on the I/O module with the voltage level used on its associated I/O expansion bus.

* * * * *